US009530121B2

(12) United States Patent
Brauer et al.

(10) Patent No.: US 9,530,121 B2
(45) Date of Patent: Dec. 27, 2016

(54) VEHICLE SERVICE PROCEDURES

(71) Applicant: Hunter Engineering Company, Bridgeton, MO (US)

(72) Inventors: Blackford F. Brauer, St. Louis, MO (US); Timothy A. Larson, Ferguson, MO (US); Jason Smith, Collinsville, IL (US)

(73) Assignee: Hunter Engineering Company, St. Louis, MO (US)

( * ) Notice: Subject to any disclaimer, the term of this patent is extended or adjusted under 35 U.S.C. 154(b) by 108 days.

(21) Appl. No.: 13/716,894

(22) Filed: Dec. 17, 2012

(65) Prior Publication Data

US 2013/0158777 A1   Jun. 20, 2013

Related U.S. Application Data

(60) Provisional application No. 61/577,506, filed on Dec. 19, 2011, provisional application No. 61/680,048, filed on Aug. 6, 2012.

(51) Int. Cl.
*G06Q 10/00* (2012.01)

(52) U.S. Cl.
CPC .................................... *G06Q 10/20* (2013.01)

(58) Field of Classification Search
None
See application file for complete search history.

(56) References Cited

U.S. PATENT DOCUMENTS

| | | | | |
|---|---|---|---|---|
| 4,817,166 A | * | 3/1989 | Gonzalez | G06K 9/3258 382/105 |
| 4,931,937 A | * | 6/1990 | Kakinami | G01S 11/12 180/169 |
| 4,942,533 A | * | 7/1990 | Kakinami | G01S 11/12 340/937 |
| 4,942,841 A | * | 7/1990 | Drucker, Jr. | G09F 11/23 116/309 |
| 5,034,739 A | * | 7/1991 | Gruhl | E04H 6/42 340/932.2 |
| 5,048,099 A | * | 9/1991 | Lee | G06K 9/2018 382/175 |
| 5,083,456 A | | 1/1992 | Colarelli | |
| 5,305,636 A | | 4/1994 | Balsarotti et al. | |
| 5,345,384 A | * | 9/1994 | Przybyla | G07C 5/0808 701/29.1 |
| 5,499,181 A | * | 3/1996 | Smith | B60L 11/1846 340/457.4 |
| 5,511,412 A | * | 4/1996 | Campbell, III | F02D 31/004 73/114.25 |

(Continued)

*Primary Examiner* — Jean-Paul C Cass
(74) *Attorney, Agent, or Firm* — Polster, Lieder, Woodruff & Lucchesi, LC

(57) ABSTRACT

A method and apparatus for carrying out a set of vehicle inspections including, but not limited to, wheel alignment measurement, brake testing, tire tread depth measurement, tire pressure monitoring, vehicle battery testing, and a review of vehicle diagnostic trouble codes in an efficient manner using a multi-function vehicle service system and a single vehicle service bay or inspection lane. Results of the vehicle inspections are incorporated into customized reports generated for a customer or for a technician, and which may be utilized to obtain approval from the customer to conduct necessary repairs and/or provide beneficial vehicle services.

9 Claims, 8 Drawing Sheets

(56) References Cited

U.S. PATENT DOCUMENTS

| | | | | |
|---|---|---|---|---|
| 5,555,171 A * | 9/1996 | Sonehara | G07C 5/0808 | 340/425.5 |
| 5,563,788 A * | 10/1996 | Yoon | B60R 16/0231 | 701/114 |
| 5,588,123 A * | 12/1996 | Loibl | B60R 16/0315 | 701/32.7 |
| 5,748,923 A * | 5/1998 | Eitrich | G05B 19/0421 | 710/305 |
| 5,781,125 A * | 7/1998 | Godau | G08C 17/02 | 340/13.26 |
| 5,890,080 A * | 3/1999 | Coverdill | B60T 8/885 | 701/31.4 |
| 5,895,845 A | 4/1999 | Burger | | |
| 5,900,828 A * | 5/1999 | Friedrichs | G08G 1/123 | 340/439 |
| 6,222,445 B1 * | 4/2001 | Beckhusen | F02P 17/12 | 307/10.6 |
| 6,330,499 B1 * | 12/2001 | Chou | G07C 5/008 | 701/31.4 |
| 6,822,582 B2 * | 11/2004 | Voeller | G07C 5/008 | 340/10.4 |
| 6,982,653 B2 * | 1/2006 | Voeller | G07C 5/008 | 340/10.42 |
| 7,043,396 B2 * | 5/2006 | Larson | G01B 21/26 | 33/203.14 |
| 7,084,750 B2 * | 8/2006 | Johanning | B60C 3/06 | 116/34 R |
| 7,350,707 B2 * | 4/2008 | Barkan | G06Q 20/042 | 235/454 |
| 7,355,687 B2 * | 4/2008 | Voeller | B60C 11/24 | 356/139.09 |
| 7,356,394 B2 * | 4/2008 | Burgess | G06Q 10/087 | 701/29.3 |
| 7,359,775 B2 | 4/2008 | Strege et al. | | |
| 7,404,427 B2 * | 7/2008 | Hillman | B60C 25/138 | 157/1 |
| 7,578,180 B2 | 8/2009 | Lionetti | | |
| 7,648,062 B2 * | 1/2010 | Corniot | B60C 25/132 | 235/375 |
| 7,683,762 B2 * | 3/2010 | Kinoshita | G06K 19/07749 | 340/10.4 |
| 7,778,751 B2 * | 8/2010 | Murphy | B60S 5/00 | 340/426.16 |
| 7,925,399 B2 * | 4/2011 | Comeau | G07C 5/008 | 701/29.6 |
| 7,983,452 B2 * | 7/2011 | Chaney | G06F 21/33 | 382/100 |
| 8,013,716 B2 * | 9/2011 | Fischer | G06K 7/0008 | 340/10.1 |
| 8,073,586 B2 * | 12/2011 | Rogers | G01B 11/2755 | 701/31.4 |
| 8,095,265 B2 * | 1/2012 | Boss | H04N 5/76 | 340/541 |
| 8,115,610 B2 * | 2/2012 | Lionetti | B60C 23/0408 | 235/384 |
| 8,250,915 B1 * | 8/2012 | Voeller | G01M 17/021 | 73/460 |
| 8,380,389 B2 * | 2/2013 | Wright | G01M 17/007 | 342/42 |
| 8,392,048 B2 * | 3/2013 | Colarelli, III | B60C 23/0408 | 340/442 |
| 8,392,975 B1 * | 3/2013 | Raghunath | G06F 17/30265 | 726/19 |
| 8,396,748 B2 * | 3/2013 | Shintani | G06Q 30/0251 | 235/379 |
| 8,401,935 B2 * | 3/2013 | Shintani | G06Q 30/0251 | 348/143 |
| 8,428,810 B2 * | 4/2013 | Afshar | G06Q 10/06 | 701/29.6 |
| 8,452,484 B2 * | 5/2013 | Rogers | G01B 11/2755 | 701/31.5 |
| 8,543,513 B2 * | 9/2013 | Shintani | G06Q 30/0251 | 705/52 |
| 8,544,111 B2 * | 9/2013 | Shintani | G06Q 30/0251 | 713/168 |
| 8,589,305 B2 * | 11/2013 | Shintani | G06Q 30/0251 | 705/30 |
| 2002/0007237 A1 * | 1/2002 | Phung | G05B 23/0216 | 701/31.4 |
| 2003/0220730 A1 * | 11/2003 | Fujioka | B62D 6/04 | 701/70 |
| 2004/0093154 A1 * | 5/2004 | Simonds | B60R 16/0315 | 701/532 |
| 2004/0093155 A1 * | 5/2004 | Simonds | H04L 67/12 | 701/532 |
| 2005/0073435 A1 * | 4/2005 | Voeller | G07C 5/008 | 340/933 |
| 2006/0058932 A1 * | 3/2006 | Garg | B60K 6/32 | 701/32.8 |
| 2007/0043487 A1 * | 2/2007 | Krzystofczyk | G06Q 10/06 | 701/29.5 |
| 2008/0040268 A1 * | 2/2008 | Corn | G06Q 10/06 | 705/305 |
| 2009/0024272 A1 * | 1/2009 | Rogers | G01B 11/2755 | 701/31.4 |
| 2009/0197228 A1 * | 8/2009 | Afshar | G06Q 10/06 | 434/219 |
| 2010/0262431 A1 * | 10/2010 | Gilbert | G06Q 50/22 | 705/2 |
| 2010/0292953 A1 | 11/2010 | Pingel | | |
| 2011/0015815 A1 * | 1/2011 | Bertness | B60L 1/003 | 701/22 |
| 2011/0040443 A1 | 2/2011 | Brauer | | |
| 2012/0130909 A1 * | 5/2012 | Corn | G06Q 10/06 | 705/303 |
| 2012/0136765 A1 * | 5/2012 | Corn | G06Q 10/06 | 705/34 |
| 2012/0296513 A1 | 11/2012 | Ramseyer | | |
| 2015/0105968 A1 * | 4/2015 | Ho | G07C 5/006 | 701/31.5 |

\* cited by examiner

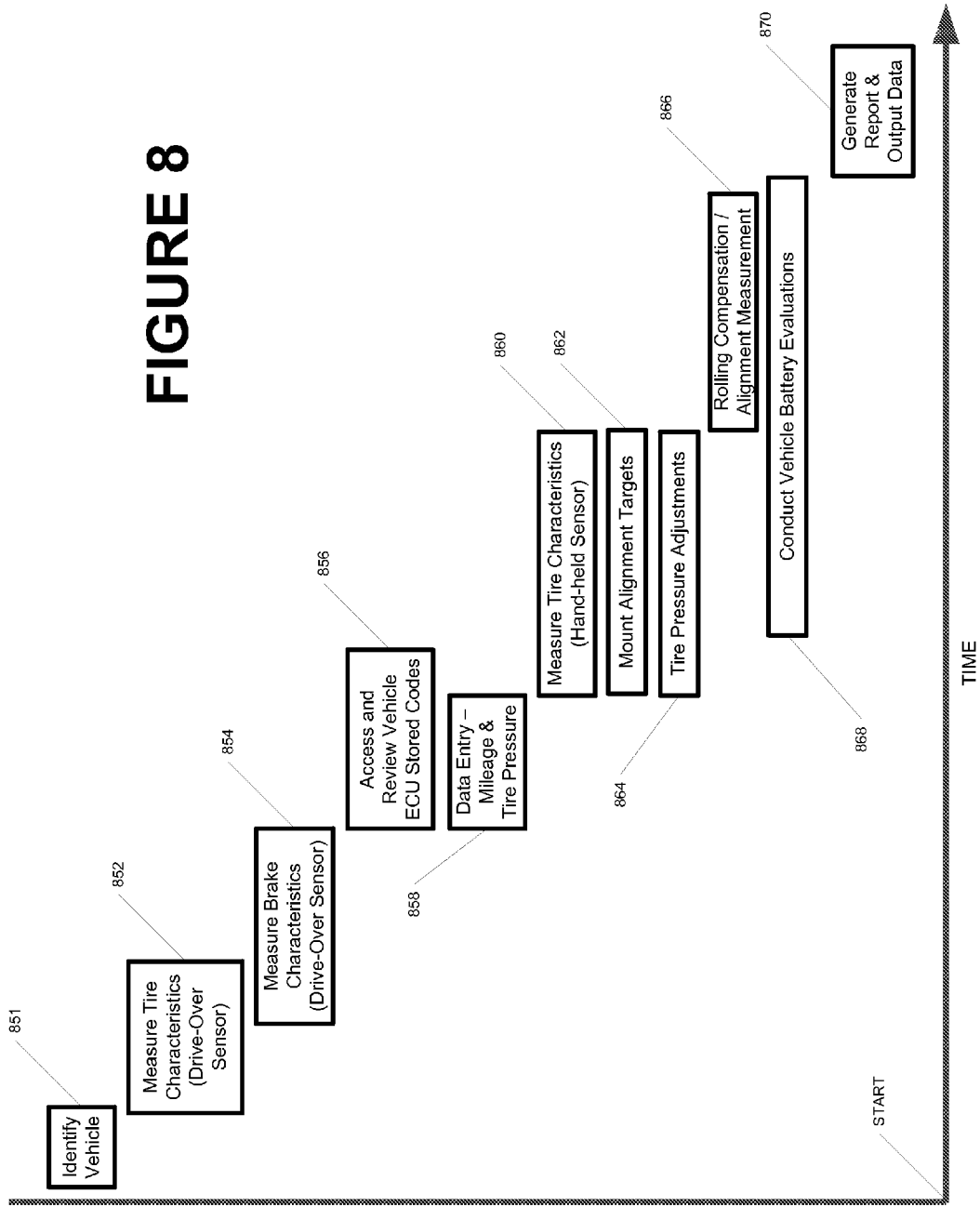

VEHICLE SERVICE PROCEDURES

CROSS-REFERENCE TO RELATED APPLICATIONS

The present application is related to, and claims priority from, U.S. Provisional Patent Application Ser. No. 61/577,506 filed on Dec. 19, 2011, and is further related to, and claims priority from, U.S. Provisional Patent Application Ser. No. 61/680,048 filed on Aug. 6, 2012, both of which are herein incorporated by reference.

STATEMENT REGARDING FEDERALLY SPONSORED RESEARCH

Not Applicable.

BACKGROUND OF THE INVENTION

The present application is related to methods and procedures for conducting a rapid safety check of several different parameters of a motor vehicle, and in particular, to methods and procedures for carrying out a series of vehicle safety checks including, but not limited to, vehicle and customer identification, wheel alignment measurement, battery testing, brake testing, tire tread depth measurement, tire pressure monitoring, and documentation and review of vehicle diagnostic trouble codes and test results using a multi-function vehicle service system and single vehicle service bay or inspection lane.

Vehicle owners generally do not bring vehicles to a service or repair shop unless the vehicle is due for a scheduled maintenance procedure or the owner has detected something is wrong with the vehicle. It is not uncommon for vehicles which are not routinely serviced will have worn or damaged components unknown to the owner/operator which may potentially have a negative impact on the safe operation of the vehicle.

Automotive service shops will routinely perform safety checks on vehicles brought in for service. However, these safety checks are time consuming and often require multiple different vehicle service systems, such as a vehicle wheel alignment measurement system, a vehicle brake testing system, and/or a vehicle diagnostic code analyzer. These different and independent service systems may be located at different locations throughout a vehicle repair shop, requiring the vehicle to be moved from one location to the next, in order to perform a diagnostic procedure at each station. The results of these discrete safety checks and/or measurements are then compiled from the individual service systems, and subsequently communicated to the vehicle owner. Often, due to the time required to complete the various individual vehicle safety checks using the different vehicle service systems and service bays, the owner will no longer be present at the shop premises. The result is that the owner may not be informed of the additional needed repairs or services until a much later time, often after completion of the repair or service for which the vehicle was initial brought to the shop. At this point, the vehicle owner will often decline to proceed with any additional repairs, and the vehicle service or repair shop fails to profit from having conducted the additional vehicle safety checks and/or inspections.

Accordingly, it would be advantage to provide a vehicle service or repair shop with an efficient means for identifying a vehicle and customer, and for automating or carrying out a series of vehicle safety checks including, but not limited to, vehicle battery testing, wheel alignment measurements, brake testing, tire tread depth measurement, tire pressure monitoring, and a review of vehicle diagnostic trouble codes using a single multi-function vehicle service system and a single vehicle service bay or inspection lane. It would be further advantageous for the comprehensive results of the several vehicle safety checks to be quickly provided to a vehicle owner/operator in a summary report in order to obtain approval to conduct necessary repairs and/or vehicle services.

BRIEF SUMMARY OF THE INVENTION

Briefly stated, the present disclosure provides a method and apparatus for conducting a plurality of vehicle service measurement and/or safety check procedures using a single multi-function vehicle service system and a single vehicle service bay or inspection lane, whereby results of one or more vehicle safety checks can be quickly provided to a vehicle owner/operator through a comprehensive customer report in order to obtain approval to conduct necessary repairs and/or vehicle services.

A further embodiment of the present invention provides a method and apparatus for conducting a plurality of vehicle service measurement and/or safety check procedures using a single multi-function vehicle service system and a single vehicle service bay or inspection lane, whereby results of several different vehicle safety checks can be quickly provided to a service technician through a detailed technician report including diagnostic information to facilitate the completion of repairs and/or vehicle services.

In an embodiment of the present disclosure, a vehicle service bay in a vehicle service shop where a vehicle undergoes maintenance procedures incorporates front wheel turn plate assemblies, and optionally, wheel rolling mechanisms on the floor or vehicle support structure (i.e., lift rack). When a vehicle is moved into the service area to undergo the maintenance procedures, basic measurements associated with the front-end wheel alignment are acquired by the multi-function vehicle service system utilizing the wheel turn plate assemblies and optional rolling mechanisms. The multi-function vehicle service system prompts the service technician to carry out a sequence of basic procedures to facilitate the acquisition of the basic front-end wheel alignment measurements. Based on the resulting measurements, the multi-function vehicle service system provides the service technician with information to present to the vehicle owner/operator, as well as graphical guidance for performing any required adjustment to the vehicle front end wheel alignment, which may be carried out concurrently with other maintenance procedures.

In an embodiment of the present disclosure, a vehicle service bay in a vehicle service shop where a vehicle undergoes maintenance procedures further incorporates a set of brake test plates on the floor or vehicle support structure, which are configured to measure individual forces at each wheel when a vehicle is driven over them and the brakes are applied. The measured forces are received at the multi-function vehicle service system, and are analyzed to identify any potential problems with the operation of the vehicle brake system. Based on the results of these measurements, the multi-function vehicle service system provides the service technician with information to present to the vehicle owner/operator as well as graphical guidance for performing any required adjustment to the vehicle brake systems, which may be carried out concurrent with other maintenance procedures.

In an embodiment of the present disclosure, a vehicle service bay in the vehicle service shop where a vehicle undergoes maintenance procedures further includes a tire tread depth measurement system, which measures the remaining tread depth of individual tires. The tread depth measurement system may include sensors embedded in the surface over which the vehicle is drive, or may consist of a hand-held device which is operatively positioned by a service technician to acquire tire tread depth measurements at individual wheels. The tread depth measurements recorded by the tread depth measurement system are received at the multi-function vehicle service system, and are analyzed to identify potential tire wear problems associated with the vehicle. Based on the results of these measurements, the multi-function vehicle service system provides the service technician with information to present to the vehicle owner/operator as well as guidance for performing any required tire rotation and/or replacements, which may be carried out concurrent with other maintenance procedures.

In an embodiment of the present disclosure, a vehicle service bay in the vehicle service shop where a vehicle undergoes a maintenance procedures further incorporates a means for establishing a communication link between a multi-function vehicle service system and an electronic control unit of a vehicle brought in to the service bay, enabling the vehicle service system to communicate with, and acquire information directly from, the vehicle electronic control unit. The acquired information may include, but is not limited to TPMS data, tire pressure, tire temperature, battery life remaining, vehicle stored error codes, and other stored OBD-II codes. Based on the data acquired from the vehicle electronic control unit, the multi-function vehicle service system provides the service technician with information to present to the vehicle owner/operator, as well as guidance for performing required or recommended service procedures which may be carried out concurrent with other scheduled maintenance procedures.

In an embodiment of the present disclosure, a multi-function vehicle service system associated with a vehicle service bay or inspection lane includes a vehicle battery testing device configured to provide an evaluation of a vehicle battery condition. When a vehicle is identified to the multi-function vehicle service system, a database of vehicle battery information is accessed to provide a technician with detailed information regarding the particular characteristics and features of the battery associated with the identified vehicle, and for evaluating the results of the vehicle battery condition evaluation communicated from the battery testing device to the multi-function vehicle service system. Appropriate information retrieved from the database and the evaluation results are combined and provided to the technician visually or in the form of a printed report.

In an embodiment of the present disclosure, a multi-function vehicle service system associated with a vehicle service bay or inspection lane is configured to acquire and store data associated with individual customers and their vehicles at various stages of a vehicle service or inspection procedure. The data may be acquired by either manual input, communication from remote computer system such as a shop management system, or by scanning of machine-readable information, such as bar codes associated with a vehicle identification number and/or customer driver license. Additional data may be acquired by digitally imaging the vehicle or portions of the vehicle, such as a license plate or worn vehicle component, and the resulting images processed to extract identifying data. The identifying data may be utilized to access or create a customer or vehicle record, either at the vehicle service system or at a remote computer system such as the shop management system, in which the results of current service or inspection procedures may be stored, together with a history of previous vehicle service records. The records may be stored locally or communicated to a remote data repository where they may be accessed as needed during a vehicle service procedure or to facilitate the generate of various reports or the identification of trends.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 8 is a graphical representation of a timeline of events associated with a method of the present disclosure for evaluating the condition of a vehicle, illustrating potential gains in efficiency and procedural overlap.

Corresponding reference numerals indicate corresponding parts throughout the several figures of the drawings. It is to be understood that the drawings are for illustrating the concepts set forth in the present disclosure and are not to scale.

Figure 1:
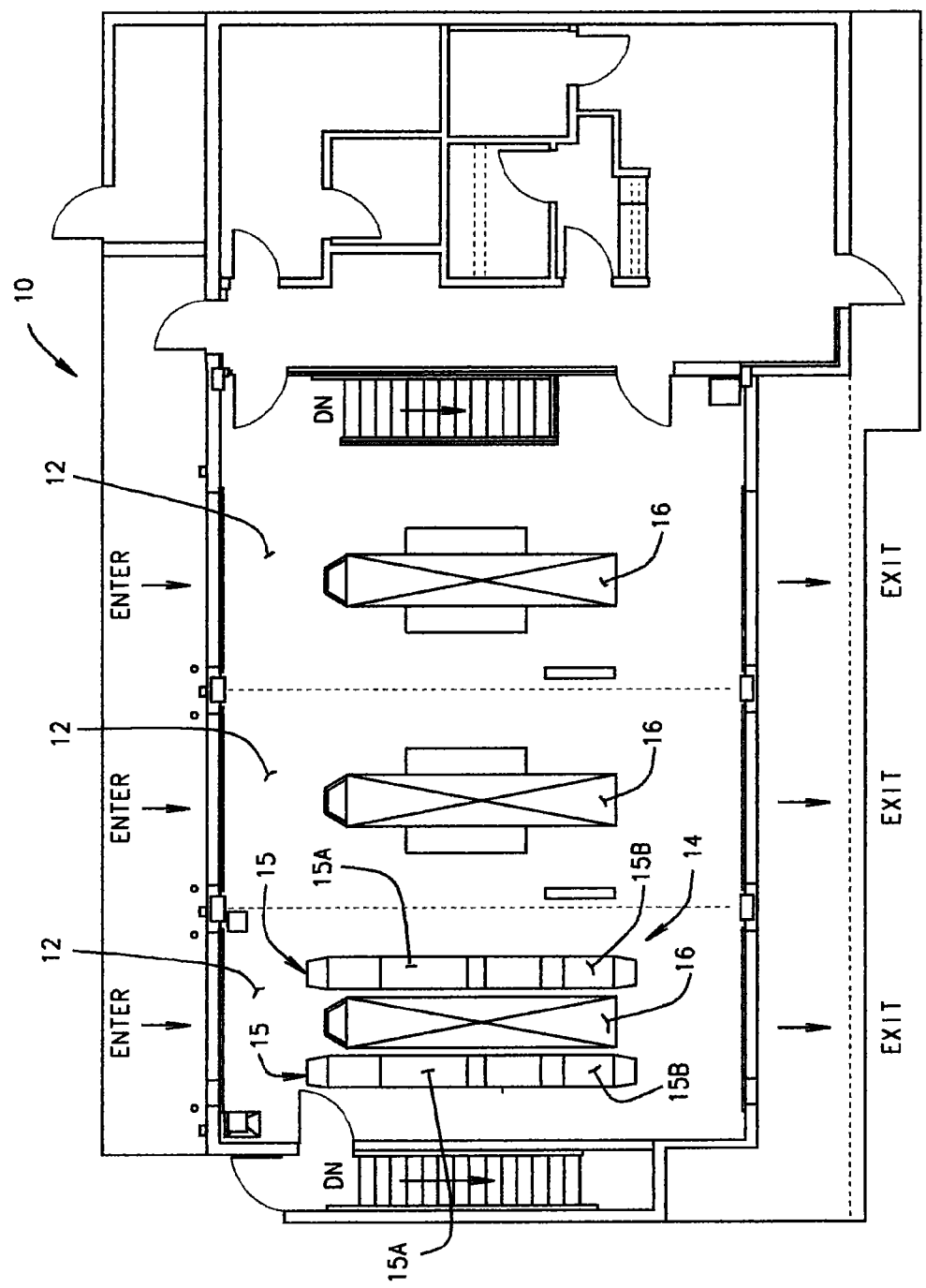
FIG. 1 is a floor plan view of an exemplary vehicle service shop, having three service bays, one of which is configured with an associated vehicle support structure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
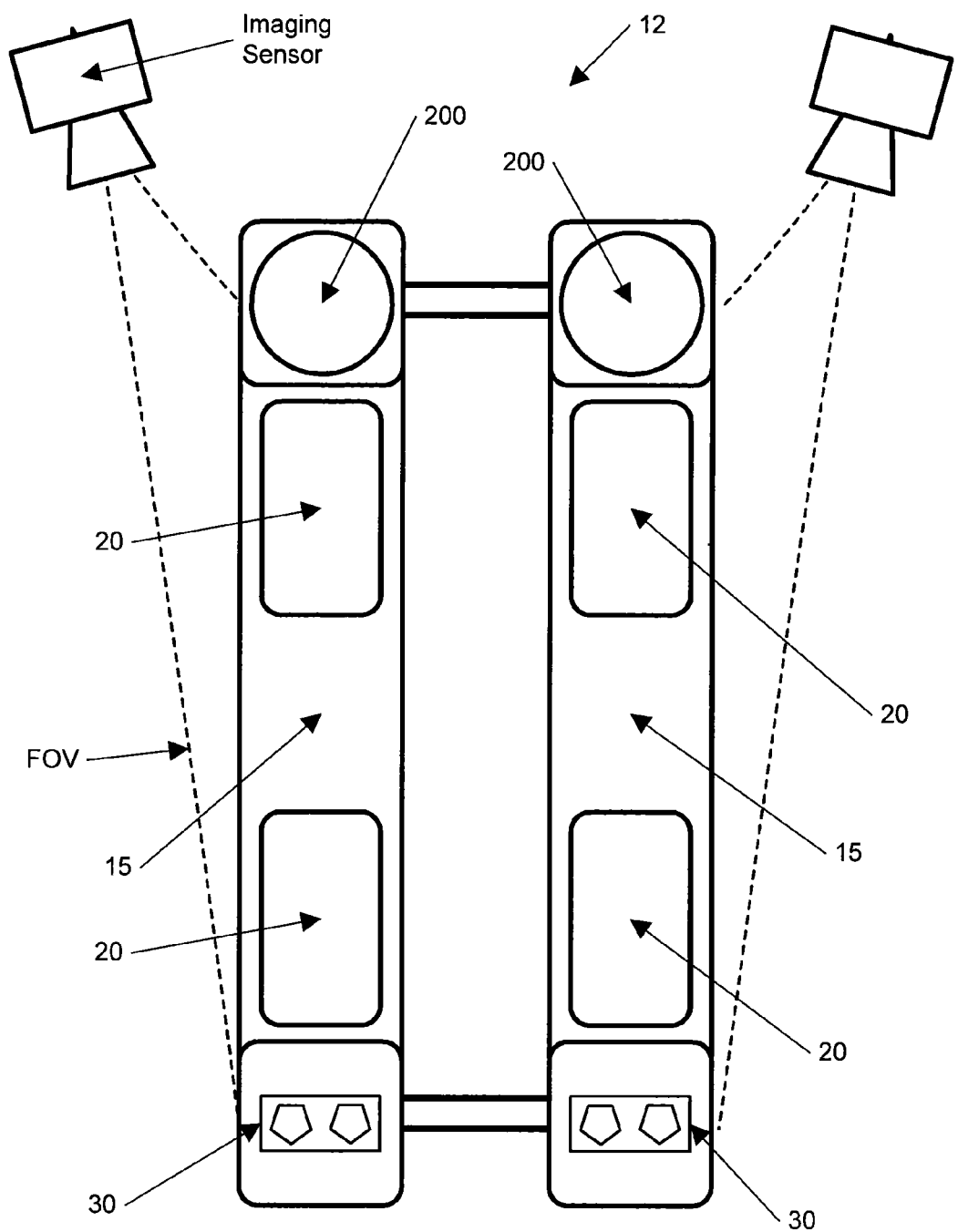
FIG. 2 is a top plan view of an exemplary vehicle support surface or lift rack including tire tread depth sensors, brake test plates, turn plates, and imaging sensors.
Figure 3:
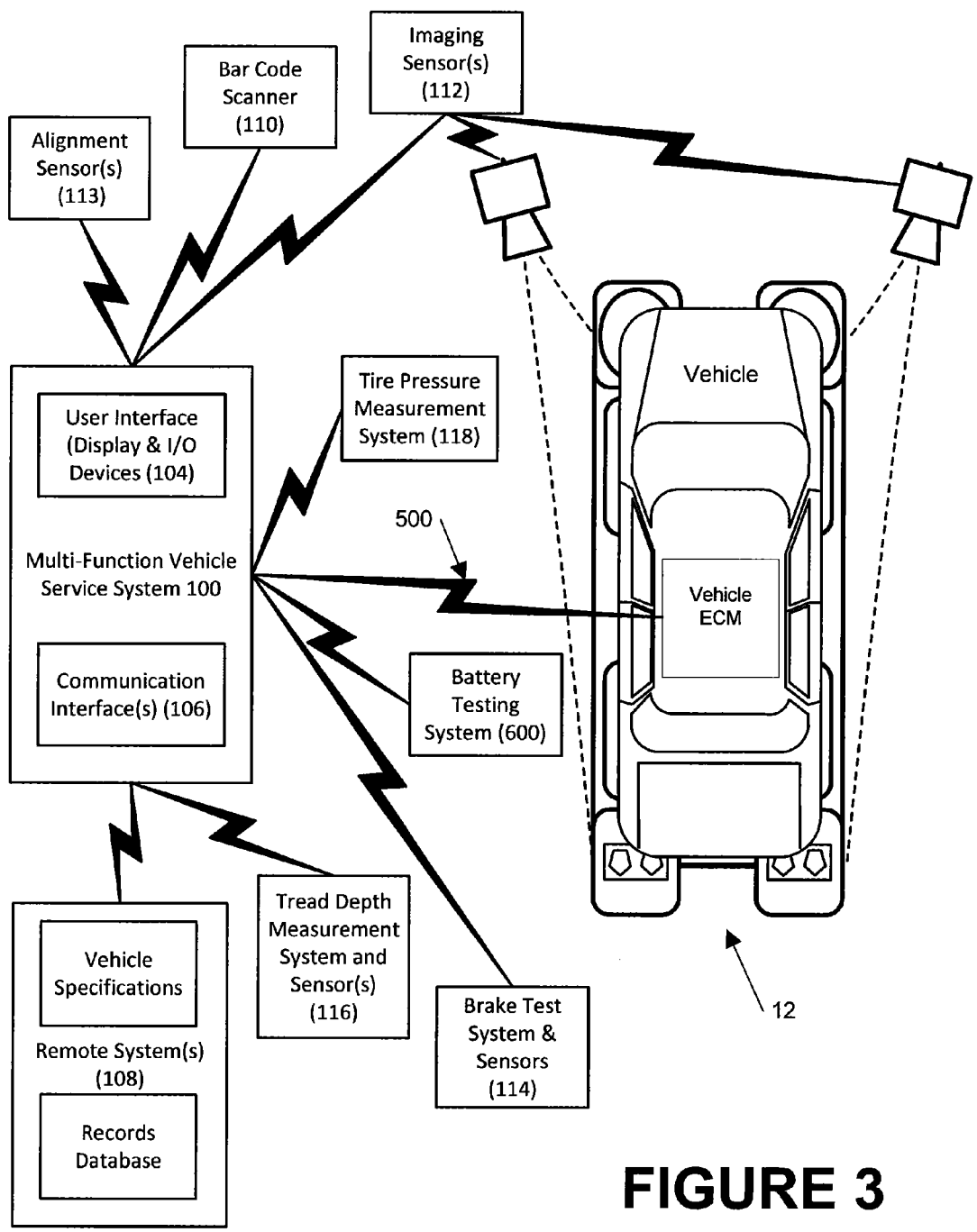
FIG. 3 is simplified diagram of the systems and sensors in communication with the multi-function vehicle service system of the present disclosure.

In general, vehicle maintenance procedures carried out by an automotive service shop or dealer 10 begin with the vehicle undergoing the maintenance being brought into the maintenance area, service bay, or service location 12, such as shown in FIGS. 1-3. Preferably, each maintenance area, service bay, or service location 12 in the service shop 10 is designed to accommodate a single vehicle in a generally predetermined location, which may be on a vehicle support structure 14, such as the floor, a set of supporting runways 15, or directly over an oil-change pit 16 in the floor of the service bay 12. As the vehicle is brought into the service bay 12, and positioned at an initial position at the predetermined location, for example, on the supporting runways 15, it may be driven over brake force testing plates 20 and/or tire condition sensors 30 optionally disposed on, or integrated with, the vehicle support structure 14 or the supporting runway surfaces 15 over which the vehicle travels to reach the predetermined location. Using the system and methods of the present disclosure, when a vehicle is moved into the service area 12 to undergo the inspection and/or maintenance procedures, the vehicle is identified, various measurements and preliminary tests are conducted, and one or more resulting reports or visual displays of vehicle information are generated from the results of the measurements and tests by a multi-function vehicle service system or vehicle inspection system 100.

The methods of the present disclosure are carried out by a service technician under the guidance of the multi-function vehicle service system or vehicle inspection system 100 associated with the service bay 12. The multi-function vehicle service system or vehicle inspection system 100 generally includes a console 102 and is configured with a suitably programmed processing system and user interfaces such as a keyboard, a bar code scanner, a display, a printer, a GUI, etc., The system further includes at least one communication interface 106 such as a wireless connection or internet connection, to communicate instructions and/or data to various diagnostic sensors, to receive and/or access measurement results obtained by diagnostic sensors, and to access procedural guidance instructions, customer and vehicle records, shop supply inventory, and vehicle specification databases. By providing bi-directional communication between the multi-function vehicle service system or inspection system 100 and various diagnostic sensors or measurement devices, data necessary to conduct a diagnostic or measurement procedure may be automatically communicated as necessary to the diagnostic sensor or measurement devices as needed. In addition, instructions or guidance can be provided directly at the diagnostic sensor or measurement device to an operator during a diagnostic or measurement procedure, directing the operator to a next step in the procedure without requiring the operator to maintain a line-of-sight to a display or console associated with the multi-function vehicle service system or vehicle inspection system.

The processing system of the multi-function vehicle service system 100 is further configured with suitable software instructions for generating reports and visual displays on an associated display device setting forth identifying information, measurements, required repairs, and/or vehicle diagnostics associated with a vehicle undergoing a service procedure. The reports and displays are configured to enable the service technician to present relevant information to a waiting customer. As described herein, a multi-function vehicle service system may be further configured with suitable software instructions to carry out one or more vehicle service or repair procedures, such as, but not limited to, vehicle wheel alignment angle adjustments. In contrast, a vehicle inspection system generally does not include software instruction for carrying out vehicle service or repair procedures, and is generally limited carrying out inspection and diagnostic procedures to acquire data and measurements for the purpose of generating suitable reports and/or data communications. The hardware configuration of a vehicle inspection system may be substantially identical to that of a multi-function vehicle service system 100, but for the programming by different software instructions.

Initially, upon entry into the service bay 12, the vehicle is identified to the multi-function vehicle service system or vehicle inspection system 100, and relevant data associated with the vehicle type, the specific vehicle itself, and/or the vehicle owner is retrieved by the multi-function vehicle service system or vehicle inspection system 100 from either local data storage or over a suitable communications link from one or more remote data repositories or computer systems 108. Vehicle identification and/or customer identification can be provided to the multi-function vehicle service system or vehicle inspection system 100 by a variety of means, including the use of scanning devices, imaging sensors, and/or digital cameras. For example, in one embodiment, the multi-function vehicle service system or vehicle inspection system 100 is configured to utilize an electronic scanner 110 to optically scan a customer's driver license. Driver licenses from most states contain machine-readable data, such as a "2D" bar code on the back surface, which encodes the driver's name and address information, and which can be decoded by the multi-function vehicle service system or vehicle inspection system 100 using suitable software instructions. Similarly, the multi-function vehicle service system or vehicle inspection system 100 may incorporate one or more cameras or imaging sensors 112 configured to acquire images of the vehicle disposed within the service bay 12. The acquired images are processed by the multi-function vehicle service system to extract vehicle identifying information, such as the alpha-numeric characters on a vehicle license plate, which may be then evaluated via optical character recognition technology to identify the specific vehicle and/or customer by cross-reference to previously stored customer data. Once the vehicle and/or customer are identified, the multi-function vehicle service system or vehicle inspection system 100 can access the appropriate customer and vehicle prior service records (if present either locally or on a remote system 108), and can present the identifying information on a display screen 104 or a vehicle condition report as shown in FIGS. 4-6, associated with the current vehicle inspection and/or service.

Preferably, as seen in FIG. 2, front wheel turn plate assemblies 200, and optionally, vehicle rolling mechanisms (not shown) are incorporated into the floor 14 or vehicle support structure 15 (i.e., lift rack). When a vehicle is moved into the service area 12, the turn plate assemblies 200 and optional vehicle rolling mechanisms are utilized to facilitate the acquisition of basic measurements associated with the steered wheel alignment angles of the vehicle by the multi-function vehicle service system or vehicle inspection system 100, as shown and described in U.S. Patent Application Publication No. 2011/0040443 A1 to Brauer, which is herein incorporated by reference. The multi-function vehicle service system or vehicle inspection system 100 is configured to prompt the service technician to carry out a sequence of basic procedures to facilitate the acquisition of the basic steered wheel alignment measurements, for example by utilizing optical target mounted to the individual vehicle wheels and observed by the imaging sensors 112. Alternatively, transducer-based alignment angle sensors (113) may be utilized to acquire basic wheel alignment angle measurements as is well known in the art.

Figure 4:
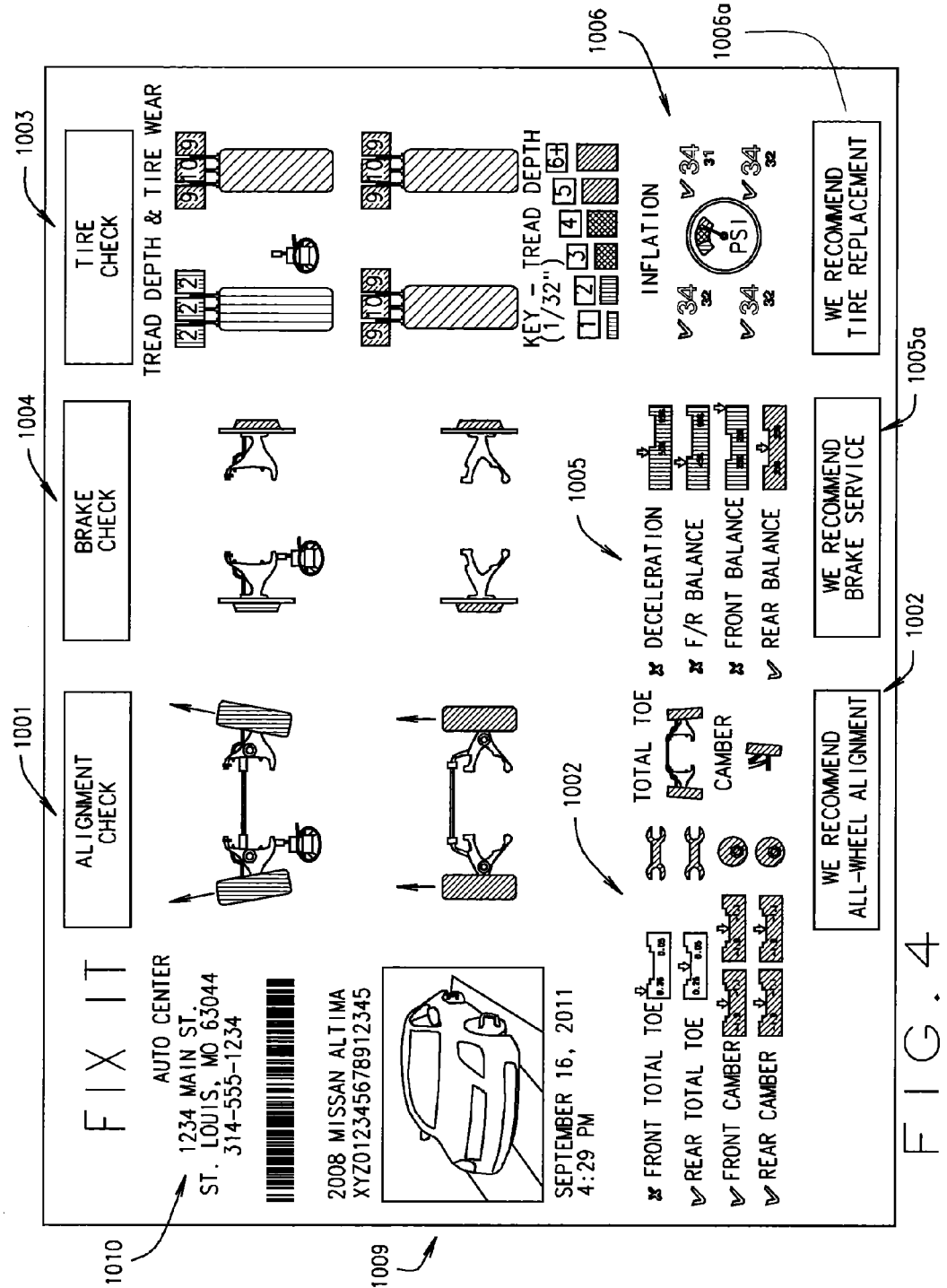
FIG. 4 is a report illustrating alignment check, brake check, and tire check measurement results.
Figure 5:
FIG. 5 is an exemplary comprehensive vehicle inspection report prepared for a customer.
Figure 6:
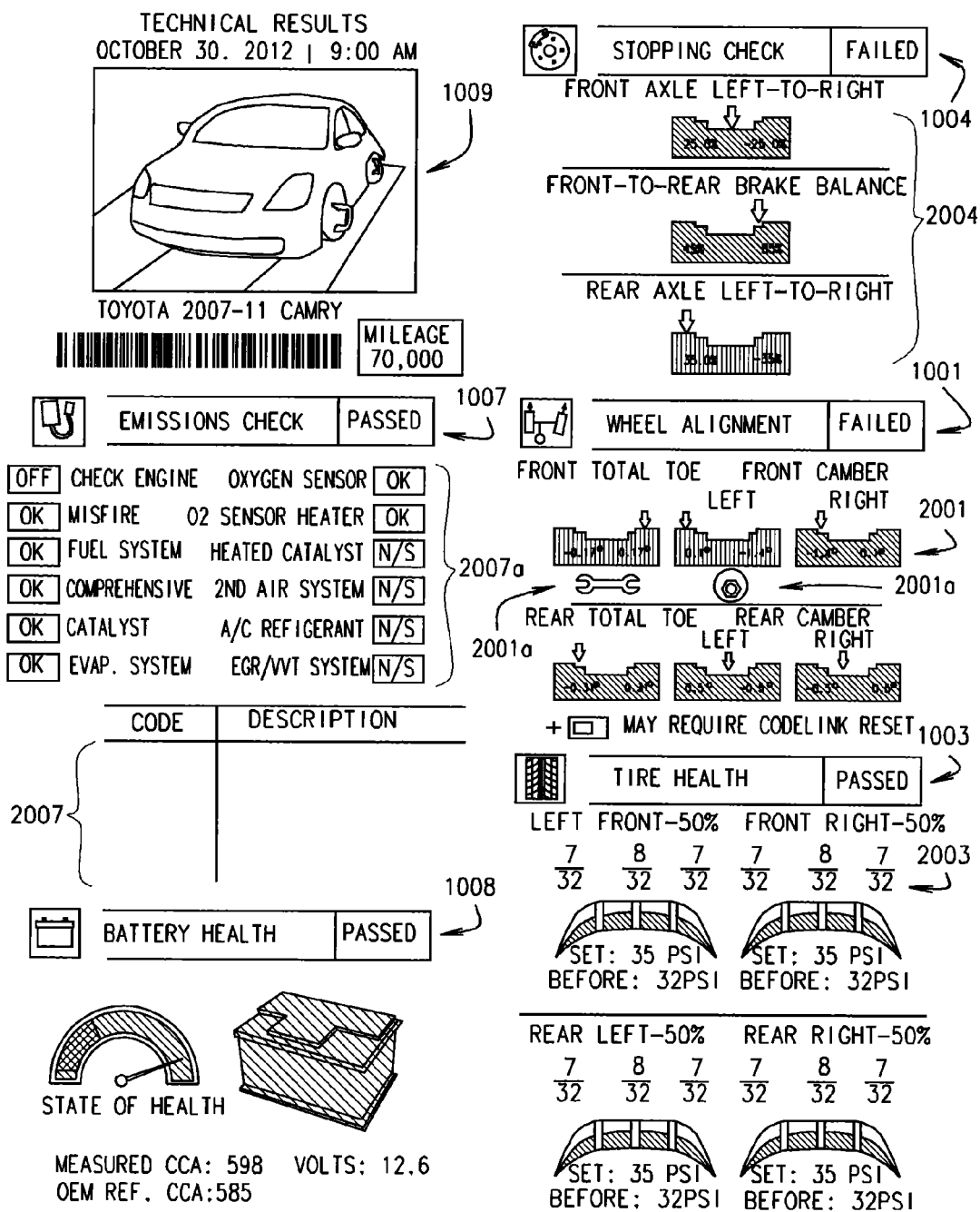
FIG. 6 is an exemplary comprehensive vehicle inspection report prepared for a service technician associated with the inspection report of FIG. 5.

Utilizing alignment angle measurements communicated from the sensors or calculated from acquired images, the multi-function vehicle service system or vehicle inspection system 100 is further configured to provide the service technician with measurement information in the form of a visual display or a portion of a comprehensive printed report as shown in FIGS. 4-6. The display or reports may be configured for presentation to the vehicle owner/operator or to provide the technician with guidance for performing any required adjustment to the vehicle's wheel alignment, which may be carried out concurrent with other maintenance procedures underway in the vehicle service bay 12.

In a further embodiment, a brake test system 114 having a set of brake test plates 20 and associated sensors is optionally disposed on the floor 14 or vehicle support structure 15 (i.e. lift rack), as seen in FIGS. 2 and 3. The brake test system 114 is operatively coupled to the multi-function vehicle service system or vehicle inspection system 100, and configured to measure forces at each wheel when a vehicle is driven into the service bay 12 over the brake test plates 20 and the brakes are applied, as shown and described in U.S. Pat. No. 5,083,456 to Colarelli, and in U.S. Pat. No. 5,305,636 to Balsarotti et al., both of which are herein incorporated by reference. The measured braking forces associated with each vehicle wheel are communicated to the multi-function vehicle service system or vehicle inspection system 100, and are analyzed by the suitably programmed processing system to identify potential problems with the operation of the vehicle brake system. Based on the results of these measurements, the multi-function vehicle service system or vehicle inspection system 100 is configured to provide the service technician with brake performance information in the form of a visual display or a portion of a comprehensive printed report as shown in FIGS. 4-6. The display or reports may be configured for presentation to the vehicle owner/operator or to provide the technician with guidance for performing required adjustments to the vehicle brake systems. Preferably, adjustments to the vehicle brake system may be carried out concurrently with other vehicle maintenance procedures underway in the vehicle service bay 12.

In a further embodiment, a tire condition measurements system 116 having one or more associated tire condition sensors 30, which may be configured to measure one or more characteristics of a the vehicle tires, such as the remaining tread depth of individual tires, tire pressure, tread wear patterns, or tire defects, is disposed in the vehicle service bay 12 and operatively coupled to the multi-function vehicle service system or vehicle inspection system 100. The tire condition sensors 30 may be optical sensors embedded in the surface 14 or vehicle support structure 15 over which the vehicle is driven, such as shown in U.S. Pat. No. 7,578,180 to Lionetti or in U.S. Patent Application Publication No. 2010/0292953 A1 to Pingel, both of which are herein incorporated by reference.

Alternatively, a tire condition sensor 30 may consist of an optical or physical hand-held tire tread depth measurement device which is operatively positioned by an operator to acquire one or more tire tread depth measurements at individual vehicle wheels, such as shown in U.S. Pat. No. 5,895,845 to Burger, herein incorporated by reference. The tire condition sensor 30, when in a hand-held configuration, preferably receives data from the multi-function vehicle service system or vehicle inspection system 100 to enable the sensor 30 to provide an operator with guidance as to which vehicle wheel to measure, and how many measurements to take at each vehicle wheel. Such information may be conveyed to the operator, for example, by means of simple illuminated lights, via a graphical display panel on the sensor 30, via an audible sound, or by vibration of the hand-held device. By providing the operator with guidance directly at the sensor 30, the operator is relieved from the need to have a line-of-sight view to a display associated with the system 100 while acquiring tire measurements. The measured tread depths or other tire characteristics recorded by the tire condition sensors 30 are subsequently communicated to the multi-function vehicle service system or vehicle inspection system 100, such as over a wireless communications link, and are analyzed by the multi-function vehicle service system or vehicle inspection system 100 to identify any potential tire wear problems associated with the vehicle. Based on the results of these measurements, the multi-function vehicle service system or vehicle inspection system 100 is configured to provide the service technician with information, in the form of a visual display or a portion of a printed report as shown in FIGS. 4-6. The display or reports may be configured for presentation to the vehicle owner/operator or to provide the technician with guidance for performing required tire rotation and/or tire replacements. Tire replacements or tire rotations may be carried out concurrently with other maintenance procedures underway in the vehicle service bay 12.

In a further embodiment, a tire pressure measurement system 118 configured to obtain measurements the inflation pressure of individual tires is disposed in the vehicle service bay 12 and operatively coupled to the multi-function vehicle service system or vehicle inspection system 100. The tire pressure measurement system 118 may be configured with one or more pressure gauges for directly measuring tire inflation pressure at the tire valve stems, or may be configured with sensors for communication with tire pressure monitoring sensors installed in the individual wheel assemblies of the vehicle. The tire pressure measurements obtained by the gauges or sensors are communicated to the multi-function vehicle service system or vehicle inspection system 100, such as over a wireless communications link, and are analyzed by the multi-function vehicle service system or vehicle inspection system 100 to identify any over-inflation or under-inflation conditions present in the vehicle wheel assemblies. Based on the results of these measurements, the multi-function vehicle service system or vehicle inspection system 100 is configured to provide the service technician with information, in the form of a visual display or printed reports as shown in FIGS. 4-6. The display or reports may be configured for presentation to the vehicle owner/operator or to provide the technician with guidance for adjusting inflation pressure in individual tires, which may be carried out concurrently with other maintenance procedures underway in the vehicle service bay 12.

In a further embodiment, a communication means 500 is provided for establishing a communication link between the multi-function vehicle service system or vehicle inspection system 100 and an electronic control module (ECM) of a vehicle disposed in the service bay 12, such as shown in U.S. Patent Application Publication No. 2005/0171662 A1 to Strege et al. and U.S. Pat. No. 7,359,775 B2 to Strege et al. (both of which are herein incorporated by reference). The communication means 500 is configured to enable the multi-function vehicle service system or vehicle inspection system 100 to acquire vehicle parameters directly from the vehicle ECM. The acquired information may include, but is not limited to vehicle identification, TPMS data, tire pressure, tire temperature, battery life remaining, stored error codes, and other stored OBD-II codes. Using the data acquired from the vehicle ECM, the multi-function vehicle service system or vehicle inspection system 100 is configured to provide the service technician with information in the form of a visual display or printed reports as shown in FIGS. 4-6. The display or reports may be configured for presentation to the vehicle owner/operator or to provide the technician with guidance for performing required or recommended service procedures, which may be carried out concurrently with other scheduled maintenance procedures underway in the vehicle service bay 12.

In a further embodiment, a battery testing system 600, such as battery diagnostic device manufactured by Midtronics, Inc. of Willowbrook, Ill., is provided at the vehicle service bay 12 for testing the condition of the vehicle's battery and communicating battery test results to the multi-function vehicle service system or vehicle inspection system 100. The battery testing device 600 provides a rapid test of the vehicle's battery to determine whether the battery should be replaced; is marginal; or needs to be recharged. The battery testing device is configured for bi-directional communication with the multi-function vehicle service system or vehicle inspection system 100, both to receive instructions therefrom and to transmit test results thereto. In an exemplary battery testing procedure, such as set forth in the flowchart of FIG. 7, a vehicle disposed in the service bay 12 is initially identified to the multi-function vehicle service system or vehicle inspection system 100, either by an operator or automatically such as noted above, enabling the multi-function vehicle service system or vehicle inspection system 100 to access a database of battery information associated with the identified vehicle.

Figure 7:
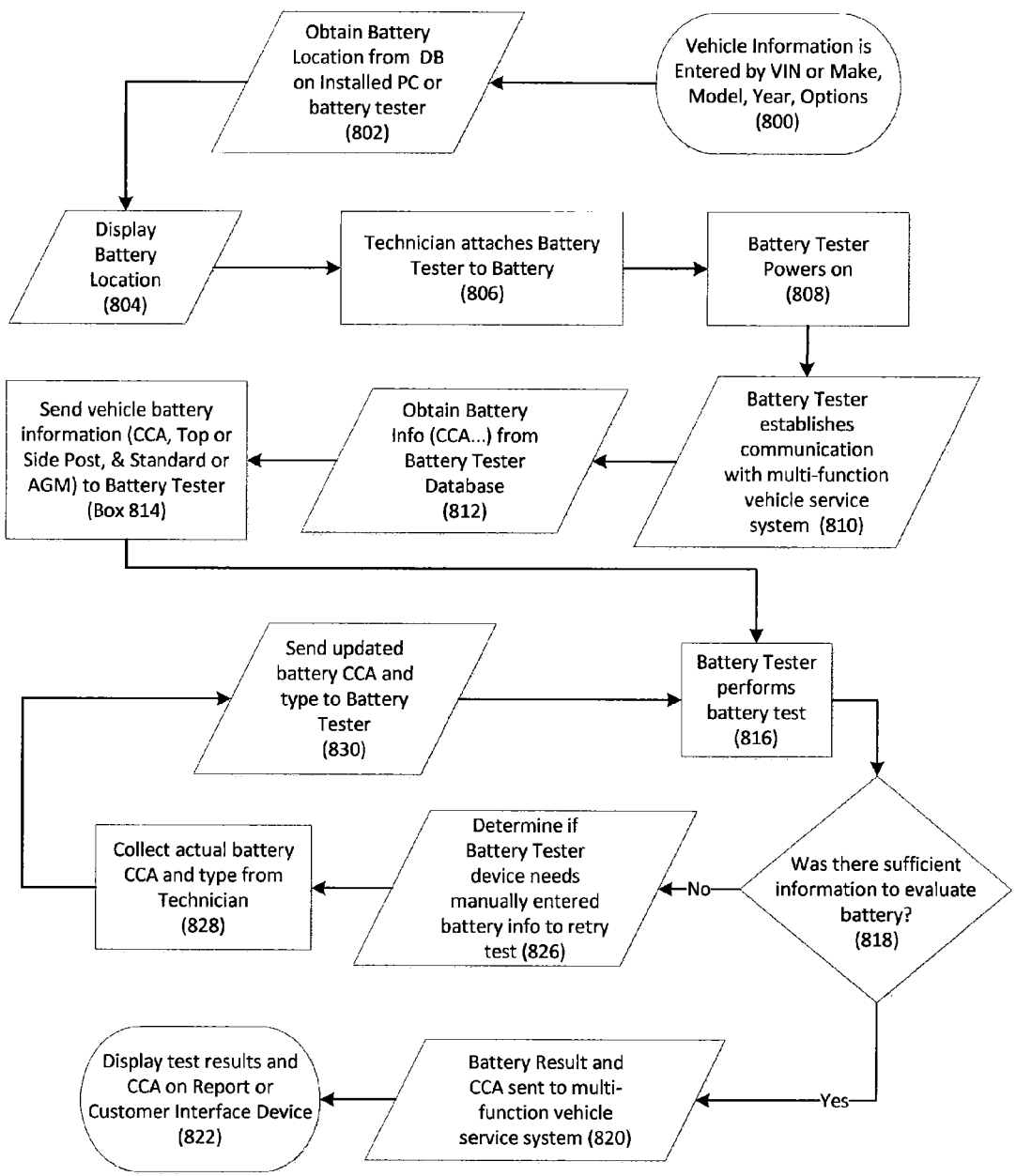
FIG. 7 is a flow chart illustrating an exemplary battery testing procedure utilized by a multi-function vehicle service system of the present disclosure.

Turning to FIG. 7, vehicle identifying information such as the VIN or make, model, and year data is initially provided (Box 800) to the multi-function vehicle service system or vehicle inspection system 100 by any suitable means. The vehicle identifying information is utilized by the multi-function vehicle service system or vehicle inspection system 100 to access a database containing vehicle-specific battery information, including the location of the battery within the vehicle (Box 802). The database may be stored locally at the multi-function vehicle service system or vehicle inspection system 100, or may be at a remote location accessed via a suitably configured communications link. Once the vehicle battery location is identified, the multi-function vehicle service system or vehicle inspection system 100 provides the service technician with directions for accessing the vehicle battery (Box 804), enabling the service technician to operatively connect the battery testing system 600 to the battery (Box 806).

Once operatively connected, the battery testing system 600 is activated (Box 808) and communication with the multi-function vehicle service system or vehicle inspection system 100 is established (Box 810). With communication established, operating parameters specific to the identified battery of the vehicle undergoing testing are retrieved (Box 812) from the battery information database by the multi-function vehicle service system or vehicle inspection system 100 and communicated to the battery testing system (Box 814). Battery operating parameters may include the battery cold cranking amps (CCA), the location of the battery terminals, the composition of the battery, the battery brand, as well as any other battery-specific information which may be relevant. After receiving the battery-specific information, the battery testing system is coupled to the vehicle battery and a test procedure is run to evaluate the operating condition of the vehicle battery (Box 816).

Once the test procedure is completed, the results are evaluated to determine if the battery testing system had sufficient battery information to properly evaluate the results of the test procedure (Box 818). If sufficient battery information was present, the battery testing system communicates the results of the test procedure to the multi-function vehicle service system or vehicle inspection system (Box 820) for display and/or inclusion in either a customer or technician report (Box 822). The results of the test procedure may include specific data such as the voltage and measured CCA, as well as a simplified determination of the overall condition of the battery such as "Good", "Marginal" or "Recharge".

If it is determined that the battery testing system either had incorrect information, or did not have sufficient battery information to properly evaluate the results of the test procedure, the battery testing system may either communicate the results of the test procedure, together with a data error message, to the multi-function vehicle service system or vehicle inspection system (Box 820) for display and/or inclusion in either a customer or technician report (Box 822), or request updated battery-specific information and repeat the test procedures. Optionally, the request for additional or updated battery information is communicated to the multi-function vehicle service system or vehicle inspection system 100 (Box 826), which in turn prompts the service technician to manually update the battery-specific information with any corrections or changes (Box 828). Any corrections or changes to the battery-specific information (such as the CCA capacity of a non-OEM installed battery) are then communicated back to the battery testing system 600 (Box 830), and the battery test procedure is re-run using the updated battery specific information (Box 816). The battery testing system may also receive information from the multi-function vehicle service system or vehicle inspection system 100 to convey to the operator, for example, by means of simple illuminated lights, via a graphical display panel on the battery testing system, 600, via an audible sound, or by vibration. By providing the operator with guidance directly at the battery testing system, 600, the operator is relieved from the need to have a line-of-sight view to a display associated with the system 100 while acquiring battery measurements.

Those of ordinary skill in the art will recognize that a single vehicle service bay 12 and multi-function vehicle service system or vehicle inspection system 100 may be configured with all or some of the features of the present disclosure, and that the ability of the multi-function vehicle service system to carry out additional vehicle service procedures and diagnostic checks not listed herein may incorporated into the system of the present disclosure, depending upon the service capabilities of the vehicle repair shop 10, without departing from the scope of the present disclosure. During a vehicle service procedure, the multi-function vehicle service system or vehicle inspection system 100 may be utilized by a service technician to identify a vehicle, communicate with, and acquire measurements associated with a vehicle from, various diagnostic and measurement devices as the vehicle is brought into the service bay or inspection lane 12 and is subsequently disposed on the vehicle support surface 14 or lift rack 15. By initially identifying the vehicle, and enabling the multi-function vehicle service system or vehicle inspection system 100 to communicate with various diagnostic and measurement devices, vehicle specific information necessary to properly carry out a diagnostic procedure or measurement may be conveyed directly to the diagnostic or measurement device without requiring additional interaction from the service technician. When properly utilized by the service technician, the multi-function vehicle service system or vehicle inspection system 100 provides the service technician with a rapid diagnostic overview of the vehicle condition, and identification of potential problems for repair, which can be promptly communicated to the vehicle owner or operator, thereby obtaining any necessary permissions to carry out additional vehicle service procedures and/or repairs, resulting in additional revenue for the vehicle repair shop.

In some configurations, such as a drive-through inspection lane, and depending upon which tests or measurements are being conducted on the vehicle, the process of testing the vehicle can be performed by the multi-function vehicle service system or vehicle inspection system 100 without substantial service technician interaction. In an automated configuration, the service technician is not required to sequentially initiate discrete steps in an inspection process as the tests or vehicle inspection proceeds. Instead, the test or vehicle inspection is automatically conducted by the multi-function vehicle service system or vehicle inspection system 100 as the vehicle is brought into position, and detected by sensors or cameras. Information necessary for the various diagnostic or measurement devices to acquire data is communicated directly from the multi-function vehicle service system or vehicle inspection system 100, and the results returned there to. At the conclusion of the automated tests for the vehicle, the multi-function vehicle service system or vehicle inspection system 100 resets after a suitable timeout period and is ready to receive the next vehicle for testing and/or inspection.

Once the various tests and/or procedures are completed, the multi-function vehicle service system or vehicle inspection system 100 is configured to store the results and/or generate the appropriate comprehensive reports for the customer and/or the vehicle service technician. These comprehensive reports preferably include a customized report containing the results of two or more sets of measurements or diagnostic procedures for the customer (such as shown at FIGS. 4 and 5) together with separate comprehensive integrated report for the technician (such as shown at FIG. 6). The reports may be presented in the form of a visual display, a single or multi-page print-out, an electronic communication such as an e-mail message, or any other suitable format, arranged as illustrated in FIGS. 4-6 and described further herein.

The exemplary reports shown at FIG. 4 through FIG. 6 illustrate two or more various measured or determined vehicle parameters, such as, but not limited to, wheel alignment measurements, brake test measurements, tire check measurements, battery condition measurements, and engine diagnostic codes. The reports may include advertising information, such as the repair shop contact information, discount coupons, etc., as well as an indication of a pass/fail condition for individual vehicle components or inspections. For failed vehicle components or inspections, the report may include additional information identifying one or more recommended or corrective service procedures.

When producing a report for the customer, such as the exemplary reports shown in FIGS. 4 and 5, the multi-function vehicle service system 100 preferably consolidates results from all of the test performed. The integrated customer report is configured to provide an easy to understand graphical representation of the results of the tests in a format designed specifically for the customer, and may include vehicle repair or service recommendations. As seen in FIGS. 4 and 5, the information on the integrated customer report may include two or more of the following:

A graphical representation of the state of the vehicle's wheel alignment and a recommendation about whether the alignment should be further checked or adjusted, as shown at 1001. The graphical representation may include a depiction of the vehicle illustrating the camber and toe angles of the vehicle, as shown at 1002, along with checkboxes indicating which angles are in- or out-of-specification, and if any adjustments should be made, as shown at 1002a;

A graphical representation of measured tire condition, such as tread depth as at 1003, illustrating for example, the tread depth remaining at the inner, center, and outer portions of each tire on the vehicle. Numerical indications of the tire tread depth remaining as a measurement or percentage may be provided as well. Other tire conditions which may be reported include tire tread wear patterns, observed tire damage, or observed tire defects;

A graphical representation of current tire inflation pressures, as at 1006, together with identifications of recommended inflation pressures;

A recommendation based on the tire conditions or measured tread depth indicating whether one or more of the vehicle tires should be replaced, such as shown at 1006a;

An illustration of the results of a vehicle brake test, as shown at 1004, including a checklist of brake balance left to right and front to rear, such as shown at 1005;

A recommendation based on the brake test results, indicating whether a detailed brake inspection is required, such as shown at 1005a;

A diagnostic checklist based on communication with the on board vehicle computers or ECM, as shown at 1007. The diagnostic checklist may include identification of any emissions related issues, an indication of whether a "check engine" condition exists, or reported trouble codes;

A recommendation based on communication with the on board vehicle computers or ECM of whether further detailed diagnostics of vehicle systems are required may be provided as shown at 1007a;

A graphical representation of the state of the vehicle battery, as at 1008, including an indication of battery voltage, CCA, and an indication of whether the vehicle battery is good, marginal or should be replaced. If related services are required, they may be identified on the report, as shown at 1008a;

Customer and vehicle identifying information, as at 1009, which may include details such as the customer name, the VIN bar code, and a photo of the vehicle being tested; and Service shop identifying information, as at 1010, which may include details such as the service shop name and address information.

When producing a report for the technician, such as shown in FIG. 6, the multi-function vehicle service system or vehicle inspection system preferably consolidates results from all of the test performed in much the same manner as the customer reports shown in FIGS. 4 and 5, and may incorporate additional technical information useful to the technician in understanding and further diagnosing issues with the vehicle. The integrated technician report provides a single, easy to understand representation of the results of the tests in a format designed specifically for the technician, and may include, in addition to the information provided on a customer report, one or more of the following:

- Bar graphs indicating how far measured alignment angles of the vehicle are in- or out-of-specification, as at 2001;
- Graphic representations indicating whether special tools or kits are needed to perform an alignment or other required service on the vehicle, as at 2001*a*;
- The actual measured tread depth at three or more locations of each tire, as at 2003;
- Bar graphs indicating the front to rear and left to right brake force imbalance, as at 2004;
- A list of specific fault (OBDII) "codes" identified during communication with the vehicle on board computers or ECM, as at 2007;
- A checklist of the state of each emissions related vehicle sub-system, as at 2007*a*; and
- Details relative to a tire pressure monitoring system (if installed on the vehicle) extracted from the on board computer.

Those of ordinary skill in the vehicle service field will recognize that the particular reports produced for the customers and for the technicians are customizable to the preference of the repair shop. The generated reports may include more or less information compared with that which is specifically illustrated herein, in response to the particular tests and/or measurements conducted by the multi-function vehicle service system or vehicle inspection system 100, as established by the automotive service shop, or as may be required by a local motor vehicle authority.

In addition to utilizing the results of the tests to generate reports, the multi-function vehicle service system or vehicle inspection system 100 can be configured with a suitable communications interface 106 to transmitted the test and/or inspection results to a remote computer system or database server 108. For example, the remote server 108 could be a web server configured to store vehicle and/or customer records and to allow access to those results from multiple locations via a web browser. The remote server 108 may also be a shop management system that maintains customer and vehicle records for a single vehicle service shop, or for a chain of related vehicle service shops. Alternatively, if the vehicle service system 100 is limited to vehicle inspection functionality, or incapable of carrying out a requires vehicle service procedure or repair, the test results and/or inspection results may be communication to a multi-function vehicle service system which is configured with suitable software instructions to carry out the necessary vehicle service procedures or repairs.

Those of ordinary skill in the art will recognize that a single vehicle service bay 12 may be configured with all or some of the features of the present disclosure, depending upon the service capabilities of the vehicle repair shop 10. During a vehicle service procedure, the multi-function vehicle service system or inspection system 100 may be utilized by a vehicle technician to acquire measurements associated with multiple systems of the vehicle as it is brought into the service bay or inspection lane 12 and disposed on the vehicle support surface. As seen in the exemplary illustration of FIG. 8, various preliminary steps and measurement procedure steps associated with the multi-function vehicle service system or inspection system 100 may be carried out in a logical sequence which permits suitable steps and portions of procedures to be carried out concurrently. The multi-function vehicle service system or inspection system 100 may be configured to implement selected steps and portions of procedures in a sequence which optimizes overall efficiency and minimizes the time required for completion. These steps may include, but are not limited to, identifying the vehicle (851), measuring tire characteristics with a drive-over sensor (852), measuring brake characteristics with a drive-over sensor (854), accessing and reviewing stored ECU codes (856), data entry of mileage and tire pressure values (858), measuring tire characteristics with a hand-held sensor (860), mounting alignment targets (862), making tire pressure adjustments (864), performing a rolling compensation or alignment measurement (866), conducting vehicle battery evaluations (868), and generating a report and output data (870). For example, as seen in FIG. 8, an operator may utilize a hand-held tire tread depth measurement device to obtain tire tread depth measurements (860) while moving around the vehicle to mount alignment angle measurement targets to the wheels (862) and coupling air hoses to the tires for automatic tire pressure adjustments (864). Those of ordinary skill in the art will recognize that other possible steps and portions of procedures may be conducted concurrently, depending upon which steps and procedures are to be implemented by the multi-function vehicle service system or vehicle inspection system 100.

When properly utilized by the service technician, the multi-function vehicle service system or vehicle inspection system 100 enables a service technician to obtain a diagnostic overview of the vehicle condition, and identification of potential vehicle problems for repair quickly and efficiently. The obtained results can be immediately communicated to the vehicle owner, thereby obtaining any necessary permissions to carry out additional vehicle service procedures and/or repairs before the vehicle owner leaves the location, resulting in additional revenue for the vehicle repair shop.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for evaluating the condition of a vehicle prior to conducting a primary vehicle service procedure in a vehicle service bay, comprising:

receiving the vehicle in the vehicle service bay in operative proximity to a multi-function vehicle service system for conducting said primary vehicle service procedure;

identifying said vehicle to said multi-function vehicle service system;

communicating data associated with said identified vehicle from said multi-function vehicle service system to a battery testing device;

prior to beginning said primary vehicle service procedure, acquiring a plurality of vehicle wheel alignment angle measurements associated with the vehicle, and at least one battery function measurement related to a battery installed within the vehicle;

communicating said acquired measurements to said multi-function vehicle service system;

evaluating said acquired vehicle wheel alignment angle measurements and said at least one battery function measurement at said multi-function vehicle service system to generate a vehicle condition report associated with said identified vehicle, said vehicle condition report including a battery condition indication and an identification of at least one wheel alignment corrective action appropriate for said vehicle in addition to said primary vehicle service procedure, wherein said battery condition indication is associated with said at least one battery function measurement, and wherein said at least one wheel alignment corrective action identified in response to at least one of said acquired vehicle wheel alignment angle measurements determined to be outside of an acceptable tolerance by said multi-function vehicle service system; and communicating said vehicle condition report to a vehicle owner prior to initiating said primary vehicle service procedure.

2. The method of claim 1 wherein said communicated data includes vehicle-specific data for configuring said battery testing device.

3. The method of claim 1 wherein said communicated data includes operator directions for presentation to an operator at said battery testing device.

4. The method of claim 1 wherein identifying said vehicle to said multi-function vehicle service system includes extracting identifying information from an image of said vehicle acquired after receiving the vehicle in the vehicle service bay, said image encompassing at least a portion of said vehicle including a vehicle license plate.

5. The method of claim 1 further including the step of scanning machine-readable data from a customer driver license to acquire customer identification data, and communicating said scanned machine-readable data to said multi-function vehicle service system.

6. The method of claim 1 wherein, responsive to said step of evaluating said acquired measurements associated with said vehicle at said multi-function vehicle service system, communicating vehicle associated data, including said acquired measurements to a vehicle wheel alignment system configured to implement a wheel alignment service procedure to adjust at least one vehicle wheel alignment angle.

7. The method of claim 1 wherein said step of acquiring said battery function measurements includes conducting a vehicle battery diagnostic test.

8. The method of claim 7 wherein said vehicle battery diagnostic test includes the steps of:

accessing, with said multifunction vehicle service system, data representative of at least one battery characteristic, said battery characteristic selected from a set including vehicle battery type, battery information, and battery location within said vehicle;

coupling a battery testing device to said vehicle battery;

communicating at least a portion of said accessed data from said multifunction vehicle service system to said battery testing device;

configuring a battery test procedure for said vehicle battery utilizing said communicated data;

completing said battery test procedure to evaluate the operating condition of said vehicle battery with said battery testing device; and communicating results of said operating condition evaluation from said battery testing device to said multifunction vehicle service system for inclusion in said at least one vehicle condition report.

9. The method of claim 1 further including the step of acquiring, prior to beginning said primary vehicle service procedure, a plurality of vehicle wheel brake force measurements from said vehicle;

wherein said step of evaluating further includes evaluating said plurality of vehicle wheel brake force measurements at said multi-function vehicle service system; and responsive to at least one of said vehicle wheel brake force measurements outside of an acceptable tolerance, identifying in said vehicle condition report at least one brake system corrective action appropriate for said vehicle in addition to said primary vehicle service procedure.

* * * * *